(12) United States Patent
Wielgosz (10) Patent No.: US 9,688,378 B2
(45) Date of Patent: Jun. 27, 2017

(54) DRAIN MAST AND ASSOCIATED METHOD

(71) Applicant: DASSAULT AVIATION, Paris (FR)

(72) Inventor: Eugène Wielgosz, Saint Aubin de Medoc (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 14/711,699

(22) Filed: May 13, 2015

(65) Prior Publication Data

US 2015/0329195 A1    Nov. 19, 2015

(30) Foreign Application Priority Data

May 15, 2014    (FR) ...................... 14 01095

(51) Int. Cl.
*B64C 1/14* (2006.01)
*F01D 25/32* (2006.01)

(52) U.S. Cl.
CPC ............ *B64C 1/1453* (2013.01); *F01D 25/32* (2013.01); *Y10T 137/0318* (2015.04); *Y10T 137/6906* (2015.04)

(58) Field of Classification Search
CPC .................................................... B64C 1/1453
USPC ........................... 220/745; 244/135 C, 135 R
See application file for complete search history.

(56) References Cited

U.S. PATENT DOCUMENTS

| | | | | | |
|---|---|---|---|---|---|
| 2,248,308 | A | * | 7/1941 | Rice ........................ | B64D 37/26 169/45 |
| 2,573,207 | A | * | 10/1951 | Lipman .................. | B64D 37/26 244/135 R |
| 2,827,911 | A | * | 3/1958 | Ayer ....................... | G05D 16/10 137/493 |
| 2,966,160 | A | * | 12/1960 | Forrester ................ | B64D 37/32 137/253 |
| 3,409,253 | A | * | 11/1968 | Berg ....................... | B64D 37/04 220/6 |
| 3,691,730 | A | * | 9/1972 | Hickey ................... | B64D 37/32 220/88.3 |
| 3,748,111 | A | * | 7/1973 | Klose ..................... | F16L 55/00 220/88.2 |

(Continued)

FOREIGN PATENT DOCUMENTS

| | | |
|---|---|---|
| DE | 4408493 | 2/1995 |
| WO | WO 02/30745 A1 | 4/2002 |
| WO | WO 02/36426 A2 | 5/2002 |

*Primary Examiner* — Justin Benedik
(74) *Attorney, Agent, or Firm* — Davidson, Davidson & Kappel, LLC (57) ABSTRACT

A drain mast or discharging fluids from an aircraft and associated method are provided. This drain mast includes a fairing including a base including an upstream section intended to be attached on an outer surface of the aircraft and a downstream section. The drain mast also includes a discharge nozzle including a discharge end opening onto the outside of the fairing, the discharge nozzle protruding from the downstream section in a first direction with respect to the base, the base and the discharge nozzle defining a tubular through-cavity, extending from the upstream section as far as the discharge end. The fairing also includes a profiled section for guiding air, protruding from the downstream section, in a direction opposite to the first direction, and configured for orienting an incident mass of air on the profiled section towards the discharge end.

18 Claims, 3 Drawing Sheets

(56) References Cited

U.S. PATENT DOCUMENTS

| | | | | |
|---|---|---|---|---|
| 3,788,040 | A * | 1/1974 | Bragg | B64D 37/32 220/88.3 |
| 5,381,742 | A * | 1/1995 | Linton | F23G 5/12 110/235 |
| 5,588,617 | A * | 12/1996 | Bliss | B08B 9/00 244/1 N |
| 5,655,732 | A * | 8/1997 | Frank | B64C 1/1453 239/171 |
| 5,794,707 | A * | 8/1998 | Alhamad | A62C 3/06 169/45 |
| 6,105,676 | A * | 8/2000 | Alhamad | A62C 3/06 169/45 |
| 6,211,494 | B1 * | 4/2001 | Giamati | B64C 1/1453 219/201 |
| 6,216,791 | B1 * | 4/2001 | Alhamad | A62C 3/06 122/17.1 |
| 6,823,831 | B2 * | 11/2004 | Chu | F02M 37/10 123/198 D |
| 7,651,055 | B2 * | 1/2010 | Turner | B64C 1/1453 244/129.1 |
| 7,731,127 | B2 * | 6/2010 | Hoffjann | F16L 5/08 244/136 |
| 8,011,033 | B2 * | 9/2011 | Wierenga | B60R 15/00 4/664 |
| 9,315,253 | B2 * | 4/2016 | Lee | B64C 1/1453 |
| 2010/0032525 | A1 * | 2/2010 | Piesker | B64C 1/1453 244/136 |

\* cited by examiner

DRAIN MAST AND ASSOCIATED METHOD

This claims the benefit of French Patent Application FR 14 01095, filed May 15, 2014 and hereby incorporated by reference herein.

The present invention relates to a drain mast for discharging fluids from an aircraft, the drain mast comprising a fairing intended to be attached on an outer surface of the aircraft, the fairing comprising:
- a base comprising an upstream section intended to be attached on the outer surface of the aircraft and a downstream section, and
- a discharge nozzle comprising a discharge end opening on the outside of the fairing, the discharge nozzle protruding from the downstream section in a first direction with respect to the base, the base and the discharge nozzle defining a tubular through-cavity, the tubular cavity extending from the upstream section as far as the discharge end.

It applies in particular to the discharge of waste water from a flying aircraft.

These waste waters notably result from the discharge of sinks of the aircraft and from the melting of ice cubes contained in ice cube drawers in which beverages are kept.

BACKGROUND

In order to achieve drainage of these waste waters, it is known to connect the drain of sinks and of ice cube drawers with a drainage circuit extending inside the aircraft as far as the fuselage of the aircraft. The drainage circuit is extended by a drain mast, attached on the skin of the fuselage on the outside of the aircraft and allowing discharge of waste waters on the outside of the aircraft.

For example the aircraft is provided with two drain masts: a first mast, located at the front of the aircraft, receives the waste waters from sinks and ice cube drawers, and a second mast, located at the rear of the aircraft, only receives waste waters from sinks.

Typically, a drain mast comprises a fairing attached onto the skin of the fuselage of the aircraft and a drainage conduit extending inside the fairing between an upstream end connected to the drainage circuit of the aircraft and a downstream end through which water is discharged on the outside of the aircraft.

The waters from the drainage of sinks are discharged in the form of a flow of a more or less significant amount of water, flowing sporadically and according to the use of the sinks.

Conversely, the waters from ice cube drawers are discharged as a permanent dropwise flow which is similar to seepage.

In order to facilitate the flow of this seepage, an air flow for example from a permanent leak from the pressurized cabin, is injected into the drainage line from the trickler as far as the drainage conduit.

Moreover, the waste waters tend to freeze upon their discharge through the drainage conduit, because of the low temperature of the atmosphere around the flying aircraft (of the order of −55° C. at the cruising altitude).

In order to attempt to solve this problem, it is known how to provide the drainage conduit with heating elements, for example comprising a heating wire wound around the drainage conduit. The electric power powering these heating elements should be limited, in order to avoid any risk of overheating when the aircraft is on the ground, which may cause melting of the fairing.

SUMMARY OF THE INVENTION

Depending on the installation conditions (supplying the mast with 28V for example), this solution, however, does not give entire satisfaction. Indeed, although it allows limitation of the freezing of waste waters from the drainage of sinks, this solution does not give the possibility of avoiding accretion of ice during drainage of waters from ice cube drawers, flowing dropwise.

The freezing of the waste waters generates accretion of ice in the drainage conduit or at the outlet of the latter. This accretion may lead to obturation of the drainage conduit and to poor discharge of the waste waters. Moreover, the ice blocks accumulated at the outlet of the drainage conduit may move upwards along the fairing of the drain mast as far as the fuselage of the aircraft. The ice cubes may also be detached during flight, hitting the fuselage of the aircraft and damaging the aircraft.

This freezing is all the more pronounced since the flow rate in the drainage conduit is low, therefore more pronounced for waters from ice cube drawers than for those from drainage of sinks.

An object of the invention is therefore to provide a drain mast for draining waste waters from an aircraft which gives the possibility of efficiently draining the waste waters, while avoiding freezing of these waters and ice accretion on the mast.

A drain mast of the aforementioned type is provided, characterized in that the fairing further comprises a profiled section for guiding air, protruding from the downstream section, in a direction opposite to the first direction, the profiled section being configured so as to orient an incident mass of air on the profiled section towards the discharge end.

The drain mast may comprise one or several of the following features, taken individually or according to any technically possible combination:
- the profiled section and the discharge nozzle form a nose protruding from the downstream section on either side of the upstream section;
- the drain mast further comprises at least one drainage conduit for a fluid, the drainage conduit extending inside the tubular cavity;
- the drainage conduit comprises an upstream end intended to be connected to a fluidic circuit of the aircraft when the drain mast is attached on the outer surface of the aircraft and a downstream end intended for discharging a fluid from the fluidic circuit on the outside of the fairing, through the discharge end;
- the downstream end and the discharge end are flush with each other;
- the downstream end is configured for discharging the fluid on the outside of the fairing along a second direction, the first direction and the second direction forming together an angle greater than or equal to 0;
- the drain mast comprises a heater for heating the drainage conduit;
- the heater cover the downstream end;
- the heater comprises at least one heating wire wound around the drainage conduit;
- the at least one heating wire is brazed on the drainage conduit;
- the drain mast comprises an electric power supplier able to electrically power the heater with a first power when the aircraft is on the ground and with a second power, strictly greater than the first power, when the aircraft is flying;

the heater comprises first and second heating wires wound around the drainage conduit, and the power supplier is able to electrically power the first heating wire excluding the second heating wire when the aircraft is on the ground and powering the first and second heating wires when the aircraft is flying;

each of the first and second heating wires, is wound around the drainage conduit in turns, and the turns of the first wire and the turns of the second wire are alternated around the drainage conduit;

the drain mast comprises a peripheral air channel extending inside the tubular cavity around the drainage conduit.

According to an embodiment, the heater is thermo-regulated.

An object of the invention is also to provide a method for draining a fluid flowing in a drainage circuit of the aircraft as far as an aperture made in a fuselage of the aircraft, the method including:

providing a drain mast according to the invention, the drain mast being attached to the fuselage in the extension of the drainage circuit, discharging the fluid outside the aircraft through the tubular cavity with the discharge end.

According to a second aspect, the invention relates to a drain mast for discharging fluids from an aircraft, the drain mast comprising:

a fairing intended to be attached on an outer surface of the aircraft, the fairing comprising a tubular through-cavity, at least one drainage conduit for a fluid, the drainage conduit extending inside the tubular cavity, a heater for heating the drainage conduit, the drain mast being characterized in that it comprises electric power supplier able to electrically power the heater with a first power when the aircraft is on the ground and with a second power, strictly greater than the first power, when the aircraft is flying.

According to this second aspect, the fairing does not necessarily comprise a profiled section for guiding air configured for orienting an incident mass of air on the profiled section towards a discharge end.

The drain mast may comprise one or more of the following features, taken individually or according to any technically possible combination:

the heater comprises first and second heating wires wound around the drainage conduit, the electric power supplier is able to electrically power the first heating wire excluding the second heating wire when the aircraft is on the ground and powering the first and second heating wires when the aircraft is flying, the electric power supplier comprises an electric power supply source, the first and second heating wires being connected in parallel to the electric power supply source, the electric power supplier comprises a switch which may be switched between an open position, in which the second heating wire is not electrically connected to the electric power supply source, and a closed position, in which the first and second heating wires are electrically connected to the electric power supply source, the electric power supplier comprises a controller capable of determining whether the aircraft is flying or on the ground and switching the switch into its open position when the aircraft is on the ground and into its closed position when the aircraft is flying.

BRIEF DESCRIPTION OF THE DRAWINGS

The invention will be better understood upon reading the description which follows, only given as an example and made with reference to the drawings wherein.

DETAILED DESCRIPTION

Figure 1:
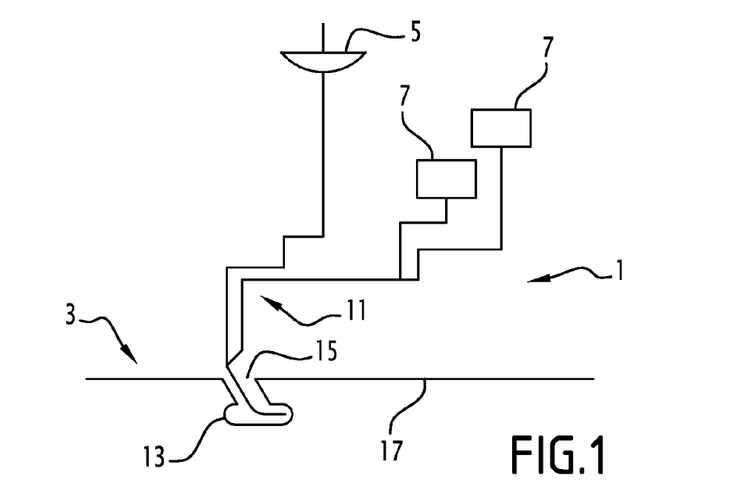
FIG. 1 is a diagram illustrating a drainage set for waste waters from an aircraft comprising a drain mast according to an embodiment of the invention.

In FIG. 1, a drainage set 1 for draining waste waters from an aircraft 3 is illustrated. The drainage set 1 is intended for discharging water flowing from a sink 5 of the aircraft 3 and water resulting from the melting of ice cubes contained in ice cube drawers 7 of the aircraft 3, in which beverages are kept.

The drainage set 1 comprises a drainage circuit 11 and a drain mast 13.

The drainage circuit 11 is fluidically connected to a drain of the sink 5 and to the ice cube drawers 7, and extends inside the aircraft as far as an aperture 15 made in the fuselage 17 of the aircraft 3.

The drain mast 13 is attached onto the skin of the fuselage 17, at the aperture 15.

The drain mast 13 extends the drainage circuit 11 on the outside of the fuselage 17 of the aircraft and thus allows discharge of the waste waters flowing from the sink 5 and from the ice cube drawers 7, via the drainage circuit 11, on the outside of the aircraft 3.

Figure 2:
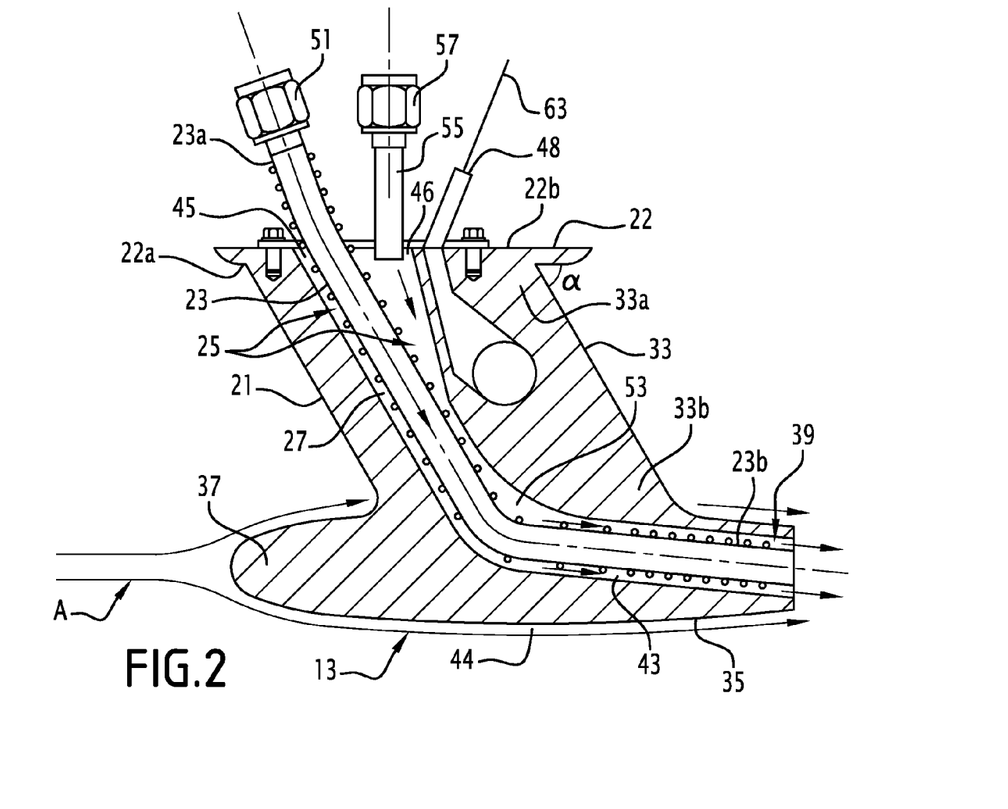
FIG. 2 is a view according to a longitudinal section of the drain mast of FIG. 1.
Figure 3:
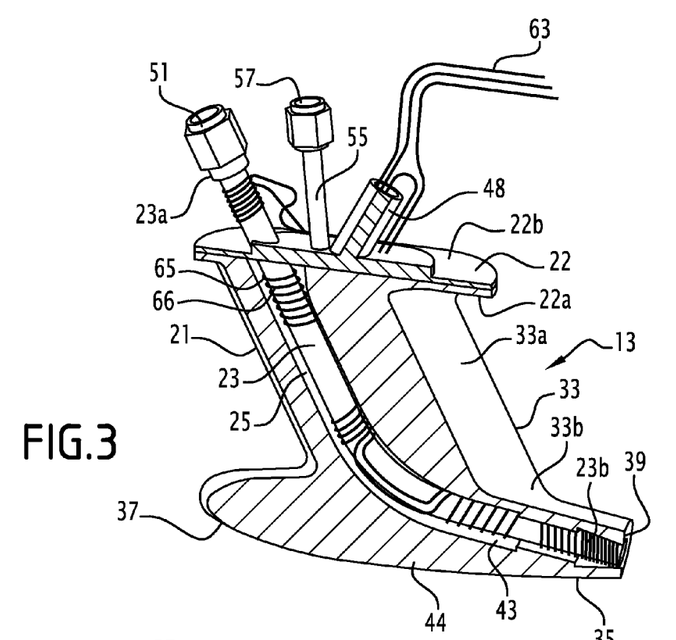
FIG. 3 is a perspective side view of a section of the drain mast of FIG. 2.
Figure 4:
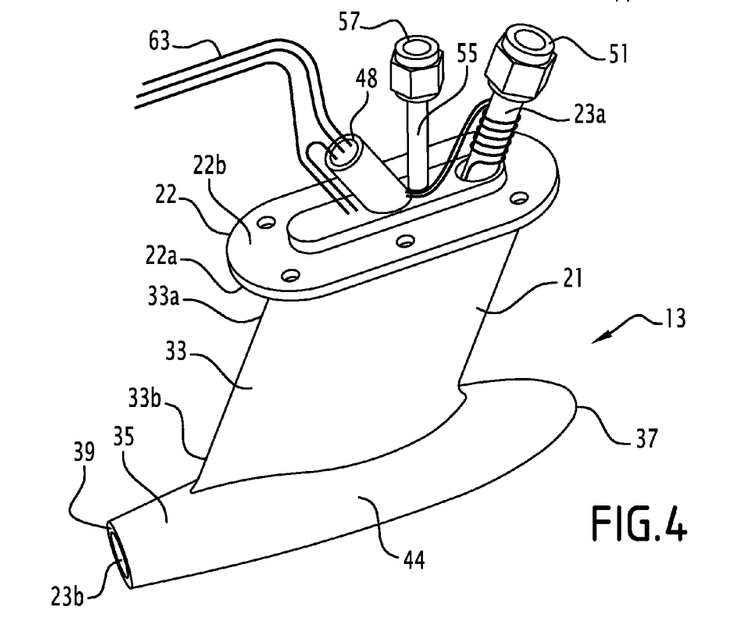
FIG. 4 is a perspective view of a drain mast according to an embodiment of the invention.

As visible in FIGS. 2 to 4, the drain mast 13 comprises a fairing 21 intended to be attached on the skin of the fuselage 17, at the aperture 15, and a plate 22 for attaching the fairing 21 onto the skin of the fuselage 17.

The drain mast 13 moreover comprises a conduit 23 for draining water, received in a tubular cavity made in the fairing 21 and an air channel 25.

The drain mast 13 further comprises a heater 27 for heating the drainage conduit 23 and an electric power supplier 29 for the heater 27.

The fairing 21 comprises a base 33, a discharge nozzle 35 and a profiled section 37 for guiding air.

The base 33 is intended to be attached onto the fuselage of the aircraft while protruding from this fuselage on the outside of the aircraft.

When the drain mast 13 is attached onto the fuselage of the aircraft, the base 33 extends along an extension direction with an angle α comprised between 55° and 65°, for example equal to 60°, with respect to the surface of the fuselage.

The base 33 comprises an upstream section 33a and a downstream section 33b.

The upstream section 33a is intended to be attached on the skin of the fuselage 17, by means of the attachment plate 22.

The downstream section 33b protrudes from the upstream section 33a, at a distance from the fuselage 17 when the drain mast 13 is attached on the fuselage 17.

The discharge nozzle 35 protrudes from the downstream section 33b in a first direction with respect to the base 33, as far as a discharge end 39.

The base 33 and the discharge nozzle 35 define a tubular through-cavity 43 supplied with cabin air. The cavity 43 has a bent shape. The cavity 43 extends through the base 33 and the discharge nozzle 35 from the upstream section 33a and ends with a convergent section in order to join the discharge end 39.

Through the cavity 43 is generated a tubular blown air channel at the outlet of the portion 23b of the drainage conduit, which isolates possible water seepages from the cold structure of the discharge nozzle 35.

The conduit 23 notably allows discharge of the waste waters flowing from the sink 5 and the ice cube drawers 7, via the drainage circuit 11, through the aperture 15 and the discharge end 39, on the outside of the aircraft 3.

When the drain mast 13 is attached to the aircraft 3, the first direction is oriented towards the rear of the aircraft 3. Thus, when waste waters are discharged through the discharge end 39, this discharge is carried out in a direction opposite to the flight direction of the aircraft, which facilitates discharge of these waste waters on the outside of the drain mast 13.

The profiled section 37 protrudes from the downstream section 33b in a direction opposite to the first direction. When the drain mast 13 is attached to the aircraft 3, the profiled section 37 thus extends the discharge nozzle towards the front of the aircraft 3.

The profiled section 37 has a shape which is tapered towards its free end. The outer surface of the profiled section 37 is configured for orienting an incident mass of air A on the guiding section towards the discharge end 39 when the aircraft 3 is flying.

Indeed, in the absence of such a profiled section, the flow of the air in the vicinity of the discharge end 39, when the aircraft 3 is flying, is turbulent flow which perturbs the blown air channel from the cavity 43 and tends to carry away the water droplets leaving the drain mast 13 via the discharge end 39 towards the fairing 21 or towards the fuselage 17 and thus causing reattachment and freezing of these droplets on the fairing 21 or on the fuselage 17.

The profiled section 37 is thus configured for stabilizing the incident air flow on the drain mast 13 and making this flow as less turbulent as possible at right angles to the discharge end 39.

The base 33 of the drain mast 13 is for example a profile NACA0012. For example, the profile has a chord of 86 mm and a thickness of 22 mm.

Moreover, the discharge nozzle 35 and the profiled section 37 form a nose 44 which protrudes from the downstream section 33b on either side of the base 33.

The nose 44 is for example a profile NACA0012. For example, the profile forming the nose has a chord comprised between 200 mm and 250 mm, notably 230 mm and a thickness comprised between 30 mm and 40 mm, notably 34 mm.

The fairing 21, i.e. the base 33 and the nose 44, is formed with two assembled parts along a longitudinal plane.

Both parts are for example made in Ultem CRS 5301/5311. They are for example assembled by adhesive bonding.

The length of the profiled section 37 protruding beyond the base 33 taken along the axis of the profiled section 37 is comprised between 50% and 60% of the width of the base.

The attachment plate 22 is a plate comprising an internal face 22a intended to be attached on the upstream section 33a of the base 33 and an external face 22b intended to be attached on the fuselage 17.

The attachment plate 22 comprises two through-apertures 45 and 46 intended for letting through conduits. The attachment plate 22 further comprises a connection pad 48 protruding from the external face 22b of the attachment plate 22 outside the drain mast 13. The connection pad 48 is intended to receive electric conductors 49 for electrically powering the heater 27.

The attachment plate 22 is for example attached by adhesive bonding onto the fairing 21.

The water drainage conduit 23 is received in the tubular cavity 43. It extends partly inside the tubular cavity 43, between an upstream portion 23a intended to be fluidically connected to the drainage circuit 11 of the aircraft, when the mast 13 is attached on the aircraft 3, and a downstream end 23b intended for discharging water circulating in the conduit 23 towards the outside of the conduit 23.

The conduit 23 has a bent shape.

The conduit 23 for example has a cross section comprised between 45 and 55 mm$^2$, i.e. for example a tube with an outer diameter of 9.52 mm, and a thickness of 0.71 mm, hence a passage section of about 50 mm$^2$.

Advantageously, the downstream end 23b of the conduit 23 and the discharge end 39 of the nozzle 35 are flush with each other.

The downstream end 23b is configured for discharging the fluid water outside the fairing 21 along a second direction with respect to the drain mast 13. The first direction and the second direction form together an angle greater than or equal to 0°, preferably strictly greater than 0°, for example equal to 7°.

The upstream portion 23a protrudes from the upstream section 33a of the base 33, through the aperture 45 of the attachment plate 22, in the extension of the base 33. This upstream portion 23a comprises a connecting end 51 able to be connected to a corresponding end of the drainage circuit 11. The upstream portion 23a is for example attached to the attachment plate 22 by brazing.

The air channel 25 extends inside the tubular element 43 around the conduit 23. The air channel 25 is intended to allow a flow of a volume of pressurized air stemming from the inside of the aircraft, through the aperture 15, through the cavity 43 and from its end convergent portion as far as the discharge end 39, where the air flow is discharged outside the fairing 21. The discharge of the air flow allows confinement of the water droplets and avoids their reattachment on the cold portions of the fairing.

The air channel 25 is formed by a chamber 53 delimited by the inner wall of the cavity 43 and the outer wall of the conduit 23, and by an air injection tube 55 intended for injecting pressurized air into the chamber 53.

The air injection tube 55 protrudes from the upstream section 33a of the base 33, through the aperture 46 of the attachment plate 22, outside the fairing 21. The air injection tube 55 is for example attached to the attachment plate 22 by brazing.

The air injection tube 55 comprises a connecting end 57 able to be connected to a corresponding end of an air circuit of the aircraft. The air circuit for example comprises a conduit connected to the pressurized cabin of the aircraft 7.

The air injection tube 55 for example has a circular cross section comprised between 20 and 30 mm$^2$, i.e. for example a tube with an outer diameter of 6.35 mm, with a wall thickness of 0.46 mm and a passage section of about 23 mm².

The heater 27 is intended to heat the drainage conduit 23 so as to thereby prevent freezing of the water circulating in this conduit 23 on the internal walls of the conduit 23 and at the outlet of the conduit 23.

The heater 27 covers at least partly the outer surface of the conduit 23. Preferably, the outer surface portion of the conduit 23 covered by the heater 27 includes the outer surface of the discharge end 39. Thus, this discharge end 39 is directly heated by the heater 27.

Figure 5:
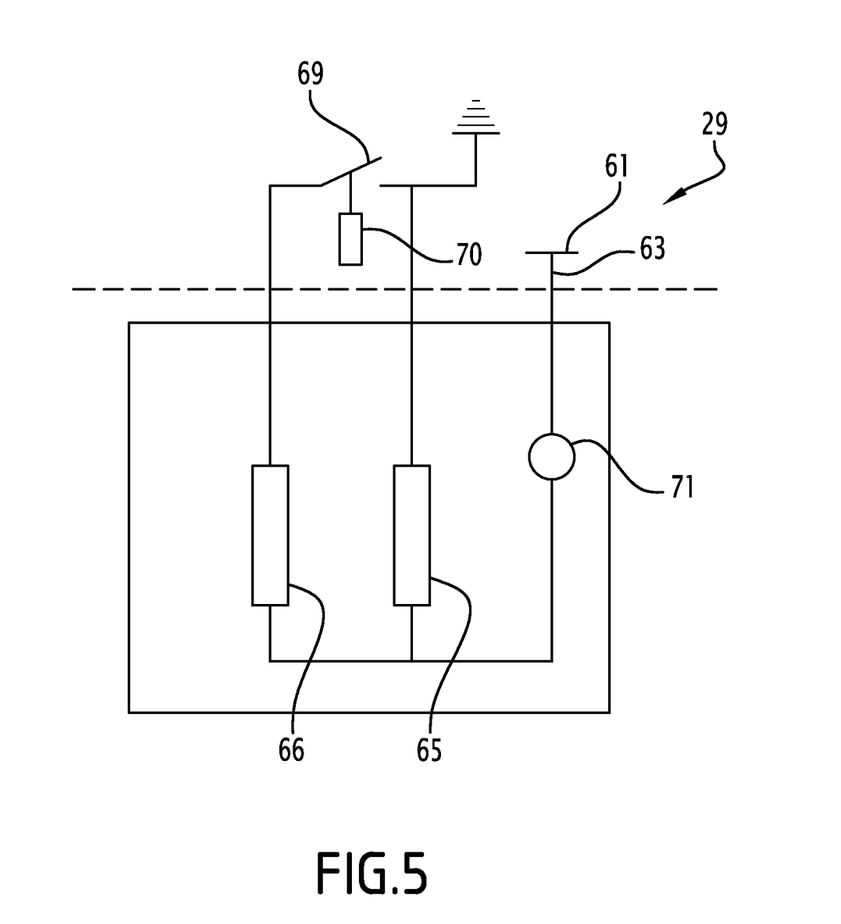
FIG. 5 is a diagram of an electric power supply circuit of a heater of the drain mast of FIG. 2.

The heater 27 is electrically connected to the electric power supplier 29, visible in FIG. 5. The electric power supplier 29 comprises a voltage generator 61 located in the aircraft 3 and electric conductors 63 electrically connecting the voltage generator to the heater 27.

The electric power supplier 29 is able to electrically power the heater 27 with a first power when the aircraft 3 is on the ground and with a second power, strictly greater than the first power, when the aircraft is flying.

Indeed, when the aircraft is flying, the drain mast 13 is subject to an outer temperature of the order of −55° C., generally much less than the temperature to which the drain mast 13 is subject when the aircraft is on the ground. Thus, a required power during flight for avoiding freezing of water on the internal walls of the conduit 23 and at the outlet of the conduit 23 may generate damages on the drain mast 13 if it is applied on the ground.

The electrical power supplier 29 gives the possibility of heating the conduit 23 so as to attain at the discharge end 39 a first temperature when the aircraft is flying, and a second temperature less than the first temperature when the aircraft is on the ground.

As illustrated in FIGS. 3 and 5, the heater 27 advantageously comprises two heating wires 65, 66 wound around the conduit 23, on the outer surface of the conduit 23.

The heating wires 65, 66 are electrically conducting wires, with respective resistances $R_{ground}$ and $R_{flight}$. These resistances $R_{ground}$ and $R_{flight}$ depend on the ambient temperature. The variation of these resistances $R_{ground}$ and $R_{flight}$ with temperature depends on the material of the heating wires 65, 66.

Preferably, the heating wires 65, 66 are brazed on the outer surface of the conduit 23, so as to ensure a better exchange of heat between the heating wires 65, 66 and the conduit 23.

Each of the heating wires is wound around the conduit 23 while forming turns.

The turns of the first and second wires are alternated around the conduit 23. Thus, the first and the second heating wires substantially cover the same portion of the outer surface of the conduit 23, and substantially heat the same portion of the outer surface of the conduit 23.

Preferably, the winding of the turns is more dense in an area of the surface of the conduit 23 close to the discharge end 39 than on the remainder of the surface of the conduit 23. Thus, the linear heating power is larger in this area than in the remainder of the surface of the conduit, which gives the possibility of obtaining, in the vicinity of the discharge end 39, a higher temperature than the one which would be obtained if the turns were wound regularly around the conduit 23.

The electric power supplier 29 is configured for electrically powering the first heating wire 65 only when the aircraft is on the ground and powering both heating wires 65, 66 when the aircraft is flying.

For this purpose, as illustrated schematically in FIG. 5, the first and second heating wires 65, 66 are powered in parallel by the voltage generator 61.

The electric power supplier 29 moreover comprises a switch 69 which may be switched between an open position, in which the second heating wire 66 is not electrically powered and a closed position, in which the second heating wire 66 is electrically powered by the voltage generator 61. In the open and closed positions, the heating wire 65 is powered by the voltage generator 61. The electric power supplier 29 further comprises a controller 70 able to determine whether the aircraft 3 is flying or on the ground and of switching the switch 69 into its open position when the aircraft 3 is on the ground and into its closed position when the aircraft 3 is flying.

Thus, when the aircraft 3 is on the ground, only the first heating wire 65 is powered and heats the conduit 23, while when the aircraft 3 is flying, the first and second heating wires 65, 66 are both powered and both heat the conduit 23.

In order to be protected against the degradations when the ambient temperature is high, a skin thermostat 71 was provided in the mast so as to allow cutting off of the powering for heating 65 when the ambient temperature is above 15° C.

The voltage V generated by the voltage generator, the resistances $R_{ground}$ and $R_{flight}$ of the heating wires 65, 66 and the materials of the heating wires 65 and 66 are selected so that when the aircraft 3 is on the ground, the heating wire 65 is able to heat the conduit 23 to a temperature avoiding any frost, but without any risk of damaging the mast 13. The voltage V generated by the voltage generator, the resistances $R_{ground}$ and $R_{flight}$ of the heating wires 65, 66 and the materials of the heating wires 65 and 66 are further selected so that when the aircraft 3 is flying, the heating wires 65 and 66 are able to heat the end of the conduit 23 to a temperature such that any accretion of ice is avoided, even under severe flight conditions.

On the ground, a temperature at the discharge end 39 of about 220° C. is sufficient for avoiding any frost.

Moreover it was estimated by means of tests that a temperature at the end 39 of the drainage conduit 23 of at least 210° C., as seen under laboratory conditions, when the aircraft is flying under ISA conditions, avoiding any accretion of ice. Nevertheless, in order to avoid any accretion of ice under extreme conditions, it is desirable to provide heating power such that the temperature of the discharge end 39 has a margin of 50% with respect to the temperature sufficient for ensuring proper operation under ISA conditions, i.e. 315° C., or even 80%, i.e. 380° C.

Thus, preferably the voltage V generated by the voltage generator, the resistances $R_{ground}$ and $R_{flight}$ of the heating wires 65, 66 and the materials of the heating wires 65 and 66 are selected so that:
  when the aircraft is on the ground with an ambient temperature comprised between +10° C. and −55° C., the heating wire 65 heats the conduit 23 with a power comprised between 20 and 30 W, and the temperature of the discharge end 39 attains a temperature $T_{ground}$ comprised between 200 and 250° C., notably substantially equal to 220° C., and
  under laboratory conditions simulating a flight of the aircraft, with an ambient temperature of −55° C., the heating wires 65 and 66 heat the conduit 23 with a power comprised between 110 and 120 W, for example equal to 112 W, and the temperature of the discharge end 39 attains a temperature comprised between 315 and 390° C., notably substantially equal to 380° C.

For example, the voltage V is selected to be equal to 27 V, the first heating wire 65 is made in Balco and has a resistance of $R_{ground}=14.58\Omega+/-5\%$ at an ambient temperature of 0° C., and the second heating wire 66 is made in Nickel and has a resistance $R_{flight}=3.35\Omega+-5\%$ at an ambient temperature of 0° C.

These values give the possibility of obtaining on the ground, a power comprised between 26 W and 29 W, depending on the ambient temperature comprised between +10° C. and −55° C., and a temperature $T_{ground}$ at the discharge end 23 of about 220° C., and during flight, a power of about 112 W (under laboratory conditions) at a temperature of −55° C., and a temperature $T_{flight}$ at the discharge end 39 of about 380° C.

The drain mast 13 thus allows, when it is attached on the fuselage 17 of the aircraft, discharge of the waste waters flowing in the circuit 11 from the sink 5 and the ice cube drawers 7 without there occurring any accretion of ice in the conduit 13 or at the outlet of the conduit 23 when the aircraft 3 is on the ground or flying, even under extreme flight conditions.

In particular, no accretion of ice occurs during sudden drainage of 5 L of water, of a permanent trickle of water at a flow rate of 3 L/min or a dripping rate of 100 drops/min.

Notably, the profiled section 37 allows stabilization of the flow of the incident air on the drain mast 13 and this flow is made as less turbulent as possible at right angles to the evacuation end 39. Thus, the water droplets from the drain mast 13 via the end of the drainage conduit 23 at the discharge 39 are discharged through this flow and will not be reattached to the drain mast 13 or on the fuselage 17.

Moreover, the heater 27 allow, by heating the conduit 23 and more specifically the discharge end 39 freezing of the discharge water to be avoided in the conduit 23 or at the outlet of the conduit 23.

Further, the air channel 25 gives the possibility of isolating the water droplets at the outlet of the drain mast 13 and thus facilitates their discharge into the flow of air at the outlet of the drain mast 13.

Other embodiments may be contemplated. Notably, according to an alternative, the electric power supplier 29 does not comprise any thermostat.

What is claimed is:

1. A drain mast for draining fluids from an aircraft, the drain mast comprising a fairing intended to be attached on an outer surface of the aircraft, the fairing comprising:
   a base comprising an upstream section intended to be attached on the outer surface of the aircraft and a downstream section, the base comprising an outer wall; and
   a discharge nozzle comprising a discharge end opening on the outside of the fairing,
   the discharge nozzle protruding from the downstream section in a first direction with respect to the base,
   the base and the discharge nozzle defining a tubular through-cavity, the tubular cavity extending from the upstream section as far as the discharge end,
   the fairing including a profiled protrusion for guiding air, the profiled protrusion protruding from the downstream section in a further direction opposite to the first direction, the profiled protrusion and the discharge nozzle forming a nose, the nose protruding from the outer wall in both the first direction and in the further direction such that the discharge nozzle forms a first end of the nose and the profiled protrusion forms a second end of the nose, the profiled protrusion being configured for orienting a mass of incident air on the profiled protrusion towards the discharge end.

2. The drain mast as recited in claim 1 further comprising at least one drainage conduit for a fluid, the drainage conduit extending inside the tubular cavity.

3. The drain mast as recited in claim 2 wherein the drainage conduit comprises an upstream end intended to be connected to a fluidic circuit of the aircraft when the drain mast is attached on the outer surface of the aircraft and a downstream end intended to discharge a fluid from the fluidic circuit on the outside of the fairing, through the discharge end.

4. The drain mast as recited in claim 3 wherein the downstream end and the discharge end are flush with each other.

5. The drain mast as recited in claim 4 wherein the downstream end is configured for discharging the fluid on the outside of the fairing along a second direction, the first direction and the second direction forming between them an angle of more than 0°.

6. The drain mast as recited in claim 3 further comprising a heater for heating the drainage conduit.

7. The drain mast as recited in claim 6 wherein the drainage conduit comprises an upstream end intended to be connected to a fluidic circuit of the aircraft when the drain mast is attached on the outer surface of the aircraft and a downstream end intended to discharge a fluid from the fluidic circuit on the outside of the fairing, through the discharge end, the heater covering the downstream end.

8. The drain mast as recited in claim 7 wherein the heater comprises at least one heating wire wound around the drainage conduit.

9. The drain mast as recited in claim 8 wherein the at least one heating wire is brazed on the drainage conduit.

10. The drain mast according to claim 8 further comprising an electric power supplier able to electrically power the heating module with a first power when the aircraft is on the ground and with a second power, strictly greater than the first power, when the aircraft is flying.

11. The drain mast as recited in claim 10 wherein the heater comprises a first and a second heating wire wound around the drainage conduit, the power supplier being able to electrically power the first heating wire excluding the second heating wire when the aircraft is on the ground and to power the first and second heating wires when the aircraft is flying.

12. The drain mast as recited in claim 11 wherein each of the first and second heating wires is wound around the drainage conduit in turns, the turns of the first wire and the turns of the second wire being alternated around the drainage conduit.

13. The drain mast as recited in claim 2 further comprising a peripheral air channel extending inside the tubular cavity around the drainage conduit, the air channel being connected to a pressurized air circuit of the aircraft.

14. A method for draining a fluid flowing in a drainage circuit of an aircraft as far as an aperture made in a fuselage of the aircraft, the method comprising:
   providing a drain mast as recited in claim 1, the drain mast being attached to the fuselage in the extension of the drainage circuit; and
   discharging the fluid outside the aircraft through the tubular cavity by the discharge end.

15. The drain mast as recited in claim 1 wherein a first outer surface of the discharge nozzle extends in the first direction from the outer wall of the base to the discharge end, the profiled protrusion protruding from the downstream section in the further direction such that a first outer surface of the profiled protrusion extends in the further direction from the outer wall to form the second end of the nose.

16. The drain mast as recited in claim 15 wherein a second outer surface of the profiled protrusion extends in the first direction from the second end of the nose to a second outer surface of the discharge nozzle.

17. The drain mast as recited in claim 16 wherein first and second outer surfaces of the profiled protrusion taper towards each other to form the second end of the nose.

18. The drain mast as recited in claim 17 wherein first and second outer surfaces of the discharge nozzle are joined to opposite edges of the discharge end of the discharge nozzle.

* * * * *